UNITED STATES PATENT OFFICE.

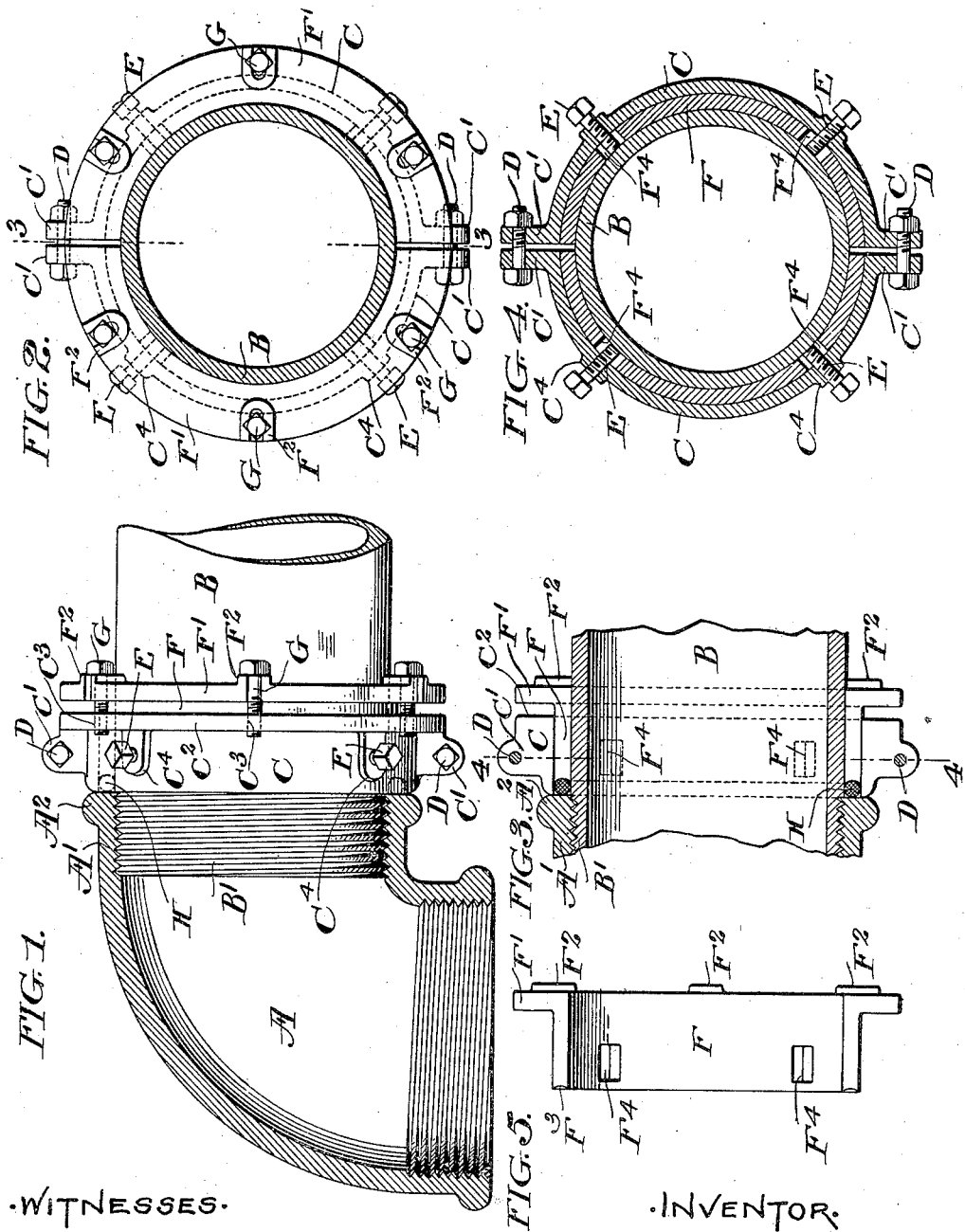

HORACE E. FRICK, OF PHILADELPHIA, PENNSYLVANIA.

LEAK-GLAND FOR PIPES.

SPECIFICATION forming part of Letters Patent No. 676,944, dated June 25, 1901.

Application filed October 23, 1900. Serial No. 34,027. (No model.)

*To all whom it may concern:*

Be it known that I, HORACE E. FRICK, a citizen of the United States of America, residing in the city and county of Philadelphia, in the State of Pennsylvania, have invented a certain new and useful Improvement in Leak-Glands for Pipes, of which the following is a true and exact description, reference being had to the accompanying drawings, which form a part thereof.

My invention relates to devices for stopping leaks in pipe-joints, having for its object to provide a simple and thoroughly-efficient device for this purpose.

The nature of my improvements will be best understood as described in connection with the drawings in which they are illustrated, and in which—

Figure 1 is a side elevation of a pipe-joint with my leak-gland applied. Fig. 2 is an end view of the joint viewed from the side of the pipe-section B. Fig. 3 is a longitudinal section on the line 3 3 of Fig. 2. Fig. 4 is a cross-section on the line 4 4 of Fig. 3, and Fig. 5 is a side elevation of one of the movable gland-sections.

A is an internally-threaded pipe-section, A' indicating the threaded portion and $A^2$ the end of the pipe-section.

B is an externally-threaded pipe-section screwing into the pipe-section A, its threaded portion being indicated at B'. The joint is formed between the threaded portions A' and B', and my leak-gland is especially designed for stopping leaks in such joint, as is here indicated.

My device consists of a divided clamping-ring the sections of which are indicated at C C, said sections being provided with flanges C', which face each other when the clamp is assembled and are secured together by bolts, as indicated at D D. The clamp-sections C are also provided with peripheral flanges $C^2$, pierced with perforations, as indicated at $C^3$, Fig. 1. The body of the clamp is reinforced at intervals, as indicated at $C^4$, and threaded perforations formed through these reinforced portions in which screw clamping-screws, (indicated at E E, &c.,) which secure the clamping-ring sections to the pipe B and at a distance from said pipe, so as to provide an annular space between the pipe and clamping-ring.

F F indicate the movable gland-sections of my device, both being provided with peripheral flanges, as indicated at F', said flanges being preferably reinforced, as shown at $F^2$, where bolt-holes are formed through the flanges. The inner edges of the gland-sections F are preferably slightly dished, as indicated at $F^3$, and slots $F^4$ $F^4$ are formed through the gland for the passage of the clamping-screws E. The flanges F' of the gland-sections are secured to the flanges $C^2$ of the clamping-ring sections by adjusting-screws, as shown at G G, &c.

H indicates a packing-ring or gasket which is placed around the pipe B so as to rest against the end $A^2$ of the pipe A and which is pressed against the end of the joint by the action of the gland-sections F F.

In practice where a leak occurs the clamping-ring sections and gland-sections are placed together, as indicated in Fig. 4, and then the nested sections placed around the pipe, as also shown in said figure, and the clamping-ring sections secured together by the bolts D D. The binding-screws E are then screwed down against the pipe B, so as to clearly fasten the clamping-ring in place thereon, and then the movable gland-sections F F are pressed forward against the gasket H by screwing up bolts G G.

Having now described my invention, what I claim as new, and desire to secure by Letters Patent, is—

1. A leak-gland for pipes having in combination a divided clamp-ring C C having means for securing its sections together and binding-screws, as E E, &c., for securing it to and at a distance from the pipe, a divided gland F F having slots $F^4$ through which pass the binding-screws E and means for drawing the gland-sections into the space between the pipe and clamp-ring.

2. A leak-gland for pipes having in combination a divided clamp-ring C C provided with a flange, as $C^2$, and having means for securing its sections together and binding-screws, as E E, &c., for securing it to and at a distance from the pipe, a divided gland F F having a flange F', slots $F^4$ through which pass the binding-screws E and adjusting-screws G G, &c., for securing the gland-sections to the clamp-ring.

HORACE E. FRICK.

Witnesses:
CHAS. F. MYERS,
D. STEWART.